United States Patent Office 3,551,415
Patented Dec. 29, 1970

3,551,415
PREPARATION OF 1,4-BENZODIAZEPIN-2-ONES
James Valentine Earley, Cedar Grove, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 776,767, Nov. 18, 1968. This application Sept. 4, 1969, Ser. No. 855,428
Int. Cl. C07d 53/06
U.S. Cl. 260—239.3          17 Claims

ABSTRACT OF THE DISCLOSURE

Substituted 1,4-benzodiazepin-2-ones are prepared from correspondingly substituted 2,3-dihydro-4(1H)isoquinolones utilizing Schmidt rearrangement conditions. In one embodiment of the process, intermediate 1,4-benzodiazepin-2-ones having a hydrogen in the 1-position are alkylated. The product 1,4-benzodiazepin-2-ones form a class of compounds having pharmacological usefulness as muscle relaxants, sedatives and anti-convulsants.

RELATED APPLICATIONS

This application is a continuation-in-part of copending application Ser. No. 776,767, filed Nov. 18, 1968.

DESCRIPTION OF THE INVENTION

The present invention relates to a process for the preparation of 1,4-benzodiazepin-2-ones from correspondingly substituted 2,3-dihydro-4(1H)isoquinolones wherein Schmidt rearrangement conditions are employed. Protection for the nitrogen atom in the heterocyclic ring may be provided by protective groups which, if desired are removed in a subsequent step after ring expansion. Since ring expansion by the Schmidt reaction results in 1,4-benzodiazepin-2-one compounds having a hydrogen on the 1-nitrogen atom, it is within the scope of the present invention to alkylate the 1-position by methods well-known in the art to produce desirable 1-substituted 1,4-benzodiazepin-2-ones.

The present invention is therefore seen to relate to the preparation of compounds of the following formula:

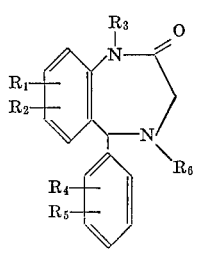

I where $R_1$, $R_2$, $R_4$ and $R_5$ are each independently selected from the group consisting of hydrogen, halogen, trifluoromethyl, lower alkoxy, lower alkyl or lower alkylthio, $R_3$ is hydrogen, lower alkyl, lower alkenyl, lower alkynyl or mono or di-lower alkylamino lower alkyl and $R_6$ is hydrogen, benzyl, aryl sulfonyl, lower alkyl sulfonyl, lower alkanoyl and aroyl.

Compounds of Formula I are readiy prepared by mutistep procedures starting with corresponding 2,3-dihydro-4(1H)isoquinolones. Starting materials are seen to correspond to the following formula:

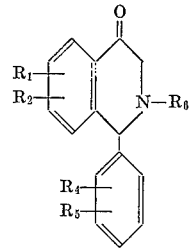

II where $R_1$, $R_2$, $R_4$, $R_5$ and $R_6$ are as above.

Isoquinolone compounds of the Formula II are ring expanded to the desired 1,4-benzodiazepine ring structure by treating the former compounds with hydrazoic acid prepared in situ such as from an alkali azide, e.g., sodium azide, in the presence of a strong acid, e.g., a strong mineral acid such as concentrated sulfuric acid. These reaction conditions are known in the art as the Schmidt reaction. The reaction product formed in the rearrangement of the isoquinolone ring is a 1,4-benzodiazepin-2-one having the structure corresponding to the following formula:

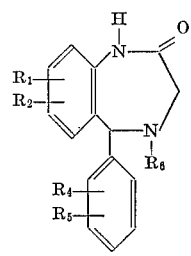

I′ where $R_1$, $R_2$, $R_4$, $R_5$ and $R_6$ are as above.

The Schmidt reaction is most conveniently conducted at a temperature in the range of from about −20° to about 100° C., most preferably in the range of from about 10° to 60° C. An organic solvent is useful to solubilize compounds of the Formula II. Suitable organic solvents include chlorinated hydrocarbons such as chloroform, carbon tetrachloride, dichloromethane, ethylene chloride, etc.

The compounds of Formula I′ produced by the operation of the Schmidt reaction may be converted into corresponding compounds substituted with a lower alkyl, lower alkenyl, lower alkynyl or mono or di-lower alkyl amino-lower alkyl radical in the 1-position by reaction of an alkali metal salt, e.g., the 1-sodium salt of the compounds of Formula I′ with a lower alkyl, lower alkenyl, lower alkynyl or mono or di-lower alkyl amino-lower alkyl reactive group, e.g., the respective halides. The aforesaid alkylation reaction proceeds under conditions well-known in the art. Compounds produced by this procedure have the following formula:

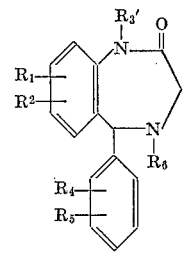

I″ where $R_1$, $R_2$, $R_4$, $R_5$ and $R_6$ are as above and $R_3'$ is lower alkyl, lower alkenyl, lower alkynyl or mono or di-lower alkylamino-lower alkyl.

Compounds of Formula I wherein $R_6$ is benzyl may be converted into compounds of Formula I wherein $R_6$ is hydrogen by cleavage of the benzyl group utilizing hydrogenation conditions in the presence of a palladium catalyst. A preferred catalyst for this purpose comprises palladium on charcoal, e.g., about 10 percent palladium on charcoal. The reaction medium employed in this hydrogenation procedure is preferably an acidic medium containing an organic acid such as glacial acetic acid and/or a mineral acid such as concentrated hydrochloric acid. The reaction medium may also include an organic solvent such as a lower alkanol, e.g., methanol.

It should be noted that the above hydrogenation may convert lower alkenyl or lower alkynyl substituents into lower alkyl groups and thereby lower the yield of desired product. Thus this reaction would not be recommended for compounds bearing such substituents. However, compounds of Formula I where $R_3$ is lower alkenyl or lower alkynyl and $R_6$ is hydrogen are readily obtainable by utilizing the Schmidt reaction on compounds of Formula II where $R_6$ is hydrogen and then alkylating the resulting compound in the 1-position in a manner known per se with a suitable alkylating agent. The reaction sequences described above for the $R_6$=benzyl embodiment are more conveniently represented by the following reaction scheme. In this scheme the meanings of $R_1$, $R_2$, $R_3$, $R_3'$, $R_4$ and $R_5$ are as above throughout.

REACTION SCHEME

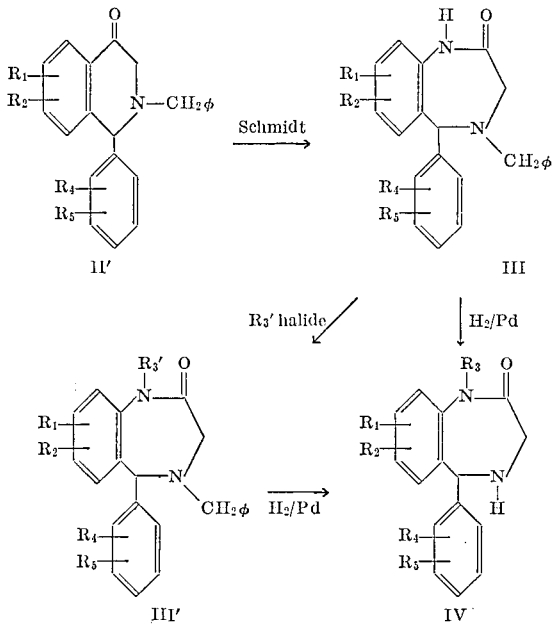

In a preferred embodiment the process of the present invention relates to compounds wherein one member of $R_1$ and $R_3$ is hydrogen and the other is halogen or lower alkoxy substituted at the 7-position of the benzodiazepine ring. Most preferred substituents include chlorine and methoxy.

In the most preferred embodiment, $R_3$ is hydrogen or lower alkyl, most preferably methyl. In such preferred embodiment, $R_4$ and $R_5$ are hydrogen. Compounds of Formula I where $R_6$=benzyl and $R_1$ or $R_2$ is hydrogen, halogen, trifluoromethyl, lower alkyl or lower alkylthio are novel compounds and as such form a preferred aspect of the present invention. Specific preferred embodiments of compounds of the Formula I are those which are substituted in the manner indicated above. Examples of representative compounds forming a preferred embodiment of this aspect of the present invention include the following:

4-benzyl-7-chloro-1,3,4,5-tetrahydro-5-phenyl-2H - 1,4-benzodiazepin-2-one;

4-benzyl-7-chloro-1-methyl-1,3,4,5 - tetrahydro-5-phenyl-2H-1,4-benzodiazepin-2-one.

As used herein, the term "lower alkyl" either alone or in combination with another radical, comprehends straight or branched chain hydrocarbon groups having from 1 to 7, preferably 1 to 4, carbon atoms such as, for example, methyl, ethyl, isopropyl, butyl, etc. The term "lower alkoxy" includes, for example, groups such as methoxy, ethoxy, propoxy, butoxy, etc. An example of a lower alkenyl group is the allyl group. The lower alkynyl group may be represented by the ethynyl group. The term "halogen" is meant to include all four halogen atoms, e.g., chlorine, bromide, fluorine and iodine unless specifically indicated otherwise. The term "aryl" as utilized herein includes for example, a phenyl group, a substituted phenyl group, e.g. lower alkyl phenyl such as tolyl and the like. The term "lower alkanol" comprehends a lower alkyl carbonyl radical. The term "aroyl" comprehends a phenyl or phenyl substituted with halogen, nitro or lower alkyl, carbonyl radical, e.g. benzoyl.

The 2-benzyl-4-isoquinolones useful as starting materials herein may be conveniently prepared according to the general procedure described in Ser. No. 357,318 filed Apr. 3, 1964 now abandoned; inventors John Thaddeus Gibas et al., utilizing appropriately substituted compounds. The above starting materials may also be prepared by the procedure disclosed in Ser. No. 571,406 filed Aug. 10, 1966 now abandoned; inventors Guenther Grethe et al. The quaternary salt of a 4-isoquinolone bearing a hydrogen in the 1-position may be converted into a 1-phenyl-4-isoquinolone by treating the former compound with phenyl Grignard in a manner known per se. This route is especially preferred when $R_1$ and/or $R_2$ is halogen.

The 2-benzyl-1-phenyl-4-isoquinolones may be converted into the coresponding compounds having a hydrogen in the 2-position by catalytic hydrogenation in the same manner described previously for the debenzylation of the 1,4-benzodiazepin-2-ones. The so produced isoquinolones may be converted into 2-arylsulfonyl, 2-lower alkyl sulfonyl or 2-lower alkanoyl substituted 4-isoquinolones by treating the 2-hydrogen substituted compounds with an aryl sulfonyl halide, a lower alkyl sulfonyl halide or a lower alkanoyl group providing agent. Representative of aryl sulfonyl halides suitable for the purposes of the present invention are tosyl halide, e.g. para toluene tulfonyl chloride, and benzene sulfonyl chloride. Suitable lower alkyl sulfonyl halides are illustrated by mesyl halide, e.g. methane sulfonyl chloride. A suitabe lower alkanoyl group providing agent can be acetic anhydride, acetyl chloride and the like. Most advantageous for the purposes of this aspect of the present invention are aryl sulfonyl halides and lower alkyl sulfonyl halides. Especially preferred is tosyl chloride. Benzoyl chloride represents a preferred aroyl providing agent.

The above reaction may be effected in the presence of an inert organic solvent such as a lower alkanol, e.g. ethanol or methanol, an ether such as diethyl ether or tetrahydrofuran, dimethylformamide, pyridine, a tertiary amine such as tertiary butyl amine or triethyl amine and the like. Suitably, an acid acceptor is provided to the reaction zone to accept the hydrohalic acid formed when utilizing a halide, e.g. an aryl-sulfonyl, lower alkyl sulfonyl or lower alkanoyl halide. Suitabe acid acceptors are tertiary amines, pyridine and the ike. Preferably, the acid acceptor is provided in large excess whereby it can serve as both a solvent medium and as an acid acceptor. Temperature and pressure are not critical and generally atmospheric pressure and temperatures above room temperature may be employed.

Compounds of Formula I wherein $R_6$ is aryl sulfonyl, lower alkyl sulfonyl, lower alkanoyl or aroyl may be converted into correspondingly substituted 4,5-dehydro-1,4-benzodiazepin-2-ones which are a known class of pharmacologically active compounds. This conversion is effected by treatment of the former compounds with a base in the presence of an inert organic solvent. Suitable bases include alkali metal, lower alkylates such as sodium methoxide, potassium tertiary butoxide and the like; alkali metal hydrides such as sodium hydride; aqueous alkali metal hydroxides such as aqueous sodium hydroxide and the like. Suitable inert organic solvents include dimethylformamide, dimethylsulfoxide, tetrahydrofuran and the like. Temperature and pressure are not critical aspects of this conversion; atmospheric pressure and a temperature in the range of from about 0° to about 80° C., preferably from about 25° to 80° C. may be conveniently employed.

The following examples are illustrative but not limitative of the scope of the present invention. The temperatures are stated in degrees centigrade.

Example 1.—Preparation of 4-benzyl-7-chloro-1,3,4,5-tetrahydro-5-phenyl-2H-1,4-benzodiazepin-2-one A solution of 0.3 g. (.864 mmole) of 2-benzyl-7-chloro-2,3-dihydro-1-phenyl - 4(1H) - isoquinolone in 20 ml. of chloroform was treated at 0° C. with 1.2 ml. of concentrated sulfuric acid. The reaction mixture (<10°) was next treated with the portionwise addition (30 min.) of 0.141 g. (2.17 mmole) sodium azide and was then heated to 50° C. for 90 minutes. The mixture was cooled in an ice bath, 3 g. of potassium carbonate was added and the mixture was then made basic with a 50 percent aqueous solution of potassium hydroxide. The precipitate was removed by filtration and the filtrates were separated and extracted with two 10 ml. portions of chloroform. The combined chloroform layers were washed with 20 ml. of saturated brine, dried over anhydrous sodium sulfate and evaporated to dryness. The residue was recrystallized twice from a mixture of dichloromethane, ether and petroleum ether to give the above-titled compound as white rods, M.P. 197–204°.

The starting material may be prepared as follows:

A solution of 196 ml. of 3 M phenylmagnesium chloride in ether (0.588 M) was treated with 18.0 g. (0.0588 M) of 2-benzyl-7-chloro-4-hydroxyisoquinolinium chloride with stirring under nitrogen. After one hour, 120 ml. of a 50/50 mixture of ether and methanol was added dropwise and after another hour 480 ml. of ether was added. The solution was filtered after stirring for an additional hour and the precipitate was washed with ether. The combined filtrates were then treated with 24 ml. of 8.4 N ethanolic hydrogen chloride and the yellow precipitate recovered by filtration was dissolved in a mixture of 100 ml. of chloroform and 75 ml. of a saturated solution of sodium bicarbonate. The chloroform layer was separated, washed with 75 ml. of saturated brine, dried over anhydrous sodium sulfate and evaporated to dryness. The residue was recrystallized from a mixture of methanol and ether to give a by-product which was discarded. The filtrates were evaporated, dissolved in benzene and chromatographed over 300 g. of silica gel. Elution with benzene (1.5 l.) gave mainly the by-product and was discarded. The ether fraction (2.5 l.) was concentrated to dryness and recrystallized from methanol to give 2-benzyl-7-chloro-2,3-dihydro-1-phenyl - 4(1H) - isoquinolone as pale yellow rods, M.P. 116–120°.

Example 2.—Preparation of 4-benzyl-7-methoxy-1,3,4,5-tetrahydro-2H-1,4-benzodiazepin-2-one A solution of 2.0 g. (7.35 mmole) of 2-benzyl-2,3-dihydro-7-methoxy-4(1H)-isoquinolone in 40 ml. of chloroform was cooled to 0° C. and 8 ml. of concentrated sulfuric acid was added dropwise with stirring. The reaction mixture was treated with 1.2 g. (18.4 mmoles) of sodium azide over a one hour period keeping the temperature below 10° C. and was then stirred at 50° for 90 minutes. The mixture was cooled in an ice bath (30° C.) while 5 g. of potassium carbonate followed by 20 ml. of a 50 percent aqueous solution of potassium hydroxide was added. The solution was filtered, and the filtrates were extracted with two 10 ml. portions of chloroform. The combined organic layers were washed with 30 ml. of saturated brine, dried over anhydrous sodium sulfate and evaporated to dryness. The residue was crystallized from methanol and then recrystallized from a mixture of dichloromethane and petroleum ether to give the above-titled compound as white rods, M.P. 145–148°.

Example 3.—Preparation of 4-benzyl-7-chloro-1-methyl-1,3,4,5-tetrahydro-5-phenyl-2H-1,4-benzodiazepin-2-one A solution of 5 g. (13.8 mmoles) of 4-benzyl-7-chloro-1,3,4,5-tetrahydro-5-phenyl-2H-1,4-benzodiazepin - 2 - one in 25 ml. of N,N-dimethylformamide was treated with 3.5 ml. (16.5 mmoles) of a 4.69 N solution of sodium methoxide in methanol. After 30 minutes 3.9 g. (27.6 mmoles) of methyl iodide was added with stirring. After 18 hours, the solution was distilled to dryness under reduced pressure and a mixture of water and ice was added. The precipitate was recovered by filtration and recrystallized first from a mixture of dichloromethane and hexane and then from methanol to give the above-titled compound as white rods, M.P. 151–154°.

Example 4.—Preparation of 7-chloro-1,3,4,5-tetrahydro-5-phenyl-2H-1,4-benzodiazepin-2-one A solution of 1 g. (2.75 mmoles) of 4-benzyl-7-chloro-1,3,4,5-tetrahydro-5-phenyl-2H-1,4-benzodiazepin-2-one in 40 ml. of glacial acetic acid, 10 ml. of concentrated hydrochloric acid and 40 ml. of water was treated with 0.2 g. of a 10 percent palladium on charcoal catalyst. Hydrogenation at atmospheric pressure was stopped when 80 ml. of hydrogen (67 ml. theory) had been adsorbed, and the reaction mixture was filtered through Celite and made basic with ammonium hydroxide. The solution was extracted with 100 ml. of dichloromethane which was washed with 50 ml. of saturated brine, dried over anhydrous sodium sulfate and evaporated to dryness. The residue was recrystallized from a mixture of dichloromethane and hexane to give the above-tilted compound as white prisms, M.P. 183–185°.

Example 5.—Preparation of 7-chloro-1-methyl-5-phenyl-4,5-dihydro-3H-1,4-benzodiazepin-2(1H)-one A solution of 1.5 g. (0.004 mmol) of 4-benzyl-7-chloro-1-methyl-1,3,4,5-tetrahydro-5-phenyl - 2H - 1,4 - benzodiazepin-2-one in 60 ml. of glacial acetic acid, 60 ml. of methanol, 60 ml. of water and 20 ml. of concentrated hydrochloric acid was treated with 0.2 g. of a 10 percent palladium on charcoal catalyst and hydrogenated at atmospheric pressure until 100 ml. of hydrogen was adsorbed (theory 97.6 ml.). The reaction was stopped and the mixture was filtered through Celite. The filtrates were made basic with ammonium hydroxide, methanol was distilled off and the precipitate recovered by filtration. Recrystallization from methanol gave the above-tilted product as white prisms, M.P. 142–145°.

Example 6.—Preparation of 7-chloro-1,3,4,5-tetrahydro-5-phenyl-2H-1,4-benzodiazepine-2-one A suspension of 200 mg. (0.68 mmol) of 7-chloro-2,3-dihydro-1-phenyl-4(1H)-isoquinolone hydrochloride in 30 ml. of chloroform was cooled in an ice bath to 0°–3°. While stirring 4 ml. of concentrated sulfuric acid was added, followed by the portionwise addition of 1.0 g. of sodium azide (addition time 1 hr., temperature 10°). The reaction mixture was then heated to 50° for 1.5 hr., cooled, poured over ice and neutralized with solid potassium carbonate. After adding 2 ml. of 50% KOH, the solids were removed by filtration and washed with dichloromethane. The organic layer of the filtrates was separated and the aqueous phase twice extracted with dichloromethane. The combined organic layers were dried over anhydrous sodium sulfate and evaporated to a crystalline solid, which after washing with a mixture of ether and petroleum ether yielded 0.90 g. (48.4%) of the above tilted product as white prisms, M.P. 174–178°. Recrystallization from a mixture of dichloromethane, ether and petroleum ether gave the pure product melting at 180–183°.

The starting material may be prepared as follows:

A solution of 1 g. (2.88 mmol) of 2-benzyl-7-chloro-2,3-dihydro-1-phenyl-4(1H)-isoquinolone in 75 ml. of glacial acetic acid was treated with 0.1 ml. of concentrated hydrochloric acid, 5 ml. of water, and 200 mg. of 10% Pd on carbon. The reaction mixture was hydrogenated at atmospheric pressure and room temperature until the uptake of $H_2$ slowed down considerably (total uptake 160 ml.). Solids were removed by filtration over Celite. The Celite was washed with dichloromethane, and the filtrates were combined. After removal of the solvent, the residue was treated wtih 2 ml. of a 10 N hydrogen chloride in methanol solution, which was then evaporated to a solid residue. The crude product was washed with acetonitrile to give 450 mg. (53.2%) of 7-chloro-2,3-dihydro-1-phenyl - 4(1H) - isoquinolone hydrochloride as white crystalline material (M.P. 233–235°). Recrystallization from a mixture of acetonitrile and ether afforded purified product, M.P. 235° decomp.

Example 7.—Preparation of 7-chloro-1,3,4,5-tetrahydro-5-phenyl-4-(p-toluenesulfonyl) - 2H - 1,4-benzodiazepine-2-one A solution of 25 mg. of 7-chloro-2,3-dihydro-1-phenyl-2-(p-toluenesulfonyl)-4(1H)-isoquinolone in 3 ml. chloroform was cooled in an ice bath to 0°–3° and was treated with 0.5 ml. of concentarted sulfuric acid. While stirring, 120 mg. of sodium azide was added in portions over a period of 45 minutes keeping the temperature below 15°. The reaction mixture was then heated for 40 minutes to 50°, poured over ice and neutralized with solid potassium carbonate. The solids were removed by filtration and washed well with dichloromethane. The organic layer of the filtrates was separated and the aqueous phase extracted twice with dichloromethane. The combined dichloromethane layers were dried over anhydrous sodium sulfate and evaporated to a white solid. Trituration of the residue with ether followed by filtration afforded the above titled product as white prisms, M.P. 249–251°.

The starting material may be prepared as follows:

A solution of 50 mg. (0.17 mmol) of 7-chloro-2,3-dihydro-1-phenyl-4(1H) isoquinolone hydrochloride in 8.5 ml. dry pyridine was treated in a nitrogen atmosphere with 200 mg. of p-toluenesulfonyl chloride. After stirring for 2½ hrs. at room temperature, the mixture was poured into ice and water. The sticky solid was washed repeatedly with water, then dissolved in ether, dried over anhydrous sodium sulfate and evaporated to a yellow solid, which after trituration with ether/pet. ether yielded 25 mg. (36%) of 7-chloro-2,3-dihydro-1-phenyl-2-(p-toluenesulfonyl) - 4(1H) - isoquinolone as yellow prisms, M.P. 148–151°. Recrystallization from a mixture of dichloromethane and petroleum ether afforded purified product, M.P. 153–155°.

We claim:

1. A process for the preparation of compounds of the formula

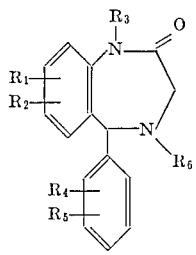

I where $R_1$, $R_2$, $R_4$ and $R_5$ are each independently selected from the group consisting of hydrogen, halogen, trifluoromethyl, lower alkoxy, lower alkyl or lower alkylthio, $R_3$ is hydrogen, lower alkyl, lower alkenyl, lower alkynyl or mono or di-lower alkylamino-lower alkyl and $R_6$ is hydrogen, benzyl, tosyl, benzene sulfonyl, lower alkyl sulfonyl, lower alkanoyl, benzoyl, halo-benzoyl, nitrobenzoyl or lower alkyl benzoyl which process comprises (a) treating a compound of the formula

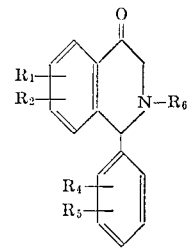

II where $R_1$, $R_2$, $R_4$, $R_5$ and $R_6$ are as above;

with hydrazoic acid whereby to form a compound of the formula

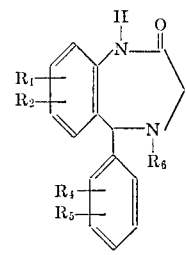

I′ where $R_1$, $R_2$, $R_4$, $R_5$ and $R_6$ are as above;

and (b) when $R_3$ in Formula I is other than hydrogen, alkylating the Formula I′ compound so as to introduce an $R_3'$ group in the 1-position where $R_3'$ is lower alkyl, lower alkenyl, lower alkynyl or mono or di-lower alkylamino-lower alkyl.

2. The process of claim 1 wherein $R_6$ is benzyl and in a subsequent step said benzyl group is cleaved by catalytic hydrogenation.

3. The process of claim 1 wherein said hydrazoic acid is prepared in situ by treating sodium azide with concentrated sulfuric acid.

4. The process of claim 1 wherein said alkylation of said Formula I′ compound is conducted by reacting said Formula I′ compound with a compound of the formula $R_3'$-halide.

5. The process of claim 1 wherein one member of $R_1$ and $R_2$ is hydrogen and the other is halogen substituted at the 7-position of the benzodiazepine ring.

6. The process of claim 5 wherein one member of $R_1$ and $R_2$ is hydrogen and the other is chlorine and $R_3$, $R_4$ and $R_5$ are hydrogen.

7. The process of claim 5 wherein one member of $R_1$ and $R_2$ is hydrogen and the other is chlorine, $R_3$ is lower alkyl and $R_4$ and $R_5$ are hydrogen.

8. The process of claim 7 wherein $R_3$ is methyl.

9. The process of claim 1 wherein one member of $R_1$ and $R_2$ is hydrogen and the other is lower alkoxy substituted at the 7-position of the benzodiazepine ring.

10. The process of claim 1 wherein $R_6$ is tosyl and benzene sulfonyl.

11. The process of claim 1 wherein $R_6$ is hydrogen.

12. A compound of the formula

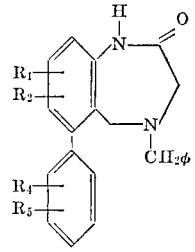

III wherein $R_1$, $R_2$, $R_4$ and $R_5$ are each independently selected from the group consisting of hydrogen, halogen, trifluoromethyl, lower alkyl or lower alkylthio.

13. The compound of claim 12 wherein one member of $R_1$ and $R_2$ is hydrogen and the other is halogen substituted at the 7-position of the benzodiazepine ring.

14. The compound of claim 13 which is 4-benzyl-7-chloro - 1,3,4,5 - tetrahydro-5-phenyl-2H-1,4-benzodiazepin-2-one.

15. A compound of the formula

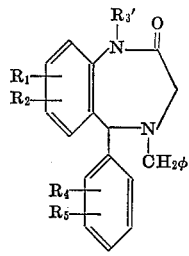

III' where $R_1$, $R_2$, $R_4$ and $R_5$ are each independently selected from the group consisting of hydrogen, halogen, trifluoromethyl, lower alkyl, or lower alkylthio and $R_3'$ is lower alkyl, or mono- or di-lower alkylamino lower alkyl.

16. The compound of claim 15 wherein one member of $R_1$ and $R_2$ is hydrogen and the other is halogen substituted at the 7-position of the benzodiazepine ring, $R_3'$ is lower alkyl and $R_4$ and $R_5$ are hydrogen.

17. The compound of claim 16 which is 4-benzyl-7-chloro - 1 - methyl - 1,3,4,5-tetrahydro-5-phenyl-2H-1,4-benzodiazepin-2-one.

References Cited

UNITED STATES PATENTS 3,501,474   3/1970   Fryer et al. _____ 260—239.3

HENRY R. JILES, Primary Examiner

R. T. BOND, Assistant Examiner

U.S. Cl. X.R.

260—288, 289; 424—244